United States Patent [19]

Inoue et al.

[11] Patent Number: 4,918,479
[45] Date of Patent: Apr. 17, 1990

[54] CAMERA

[75] Inventors: Manabu Inoue; Yoshiaki Hata, both of Osaka; Kouichi Kobayashi; Norifumi Nakagawa, both of Tokyo, all of Japan

[73] Assignees: Minolta Camera Kabushiki Kaisha, Osaka; Copal Company, Ltd., Tokyo, both of Japan

[21] Appl. No.: 351,782

[22] Filed: May 15, 1989

[30] Foreign Application Priority Data

May 16, 1988 [JP] Japan ................................ 63-118796

[51] Int. Cl.⁴ ........................ G03B 1/00; G03B 7/00; G03B 7/097
[52] U.S. Cl. ................................ 354/400; 354/439; 354/412; 354/173.1
[58] Field of Search ............... 354/400, 435, 436, 437, 354/439, 440, 446, 448, 451, 452, 453, 456, 458, 234.1, 268, 412, 173.1, 173.11

[56] References Cited

U.S. PATENT DOCUMENTS

| | | | |
|---|---|---|---|
| 4,299,459 | 11/1981 | Mirokami et al. | 354/452 |
| 4,348,089 | 9/1982 | Shenk | 354/400 X |
| 4,389,111 | 6/1983 | Uchidoi et al. | 354/268 X |
| 4,634,254 | 1/1987 | Ogihara et al. | 354/439 X |
| 4,696,560 | 9/1987 | Ogihara et al. | 354/439 |

Primary Examiner—W. B. Perkey
Attorney, Agent, or Firm—Willian Brinks Olds Hofer Gilson & Lione

[57] ABSTRACT

A camera including operable means changeable from an initial position to a predetermined position and vice versa, drive means for driving the operable means, detection means for detecting that the operable means reaches the predetermined position, control means for controlling the drive means, whereby the operable means is forcibly reset in the initial position when an erroneous operation occurs. The camera detects the occurrence of erroneous operations and automatically suspends the driving of the operable means so as to eliminate the influence of erroneous operations and assure accurate photography.

14 Claims, 8 Drawing Sheets

CAMERA

BACKGROUND OF THE INVENTION AND RELATED ART STATEMENT

The present invention broadly relates to a camera, more particularly, relates to an auto-focus camera.

An auto-focus camera has been known which employs a stepping motor which operates in accordance with the result of photometry so as to drive a shutter device for controlling the exposure time and to control the lens drive to extend or retract the taking lens.

More specifically, since an auto-focus camera usually incorporates a microcomputer, various controls performed in accordance with data obtained through various sensors are preferably conducted digitally, and this is a reason why a stepping motor is preferably used.

Accordingly, such an auto-focus camera is required to incorporate a power supply for driving the stepping motor It has been experienced that the power supply is accidentally turned off during driving of motors. It is also experienced that the initial rotational phase of the stepping motor is deviated for some reasons from the correct initial set position. If the photographer is not aware of occurrence of such an error, undesirable effects are caused such as a significant exposure error or a large amount of defocus.

Erroneous operations of lens and shutter are also caused by various other reasons such as omission of a pulse from a driving pulse train resulting in a phase offset of the stepping motor, even when the initial rotational phase of the stepping motor is set correctly. Erroneous operation is also caused due to a trouble in a mechanical linking system or a defect in a magnet which is used for setting the lens in the in-focus position.

On the other hand, cameras are known which are capable of informing the user of the occurence of erroneous operations.

However, these known cameras can inform the user of only the occurence of erroneous operations but can not automatically stop driving of the lens and reset the lens at the initial position. Also, these known cameras can not automatically suspend the photography operations when an erroneous operation occurs.

Furthermore, since these known cameras have many sensors corresponding to many detection objects, i.e., various motions or mechanisms to be monitored, the number of parts is undesirably increased. Accordingly, these known cameras fail to meet the demand for reduction in the size and cost.

SUMMARY OF THE INVENTION

It is an object of the present invention to provide a camera which has overcome the above-mentioned drawbacks and makes it possible to detect the occurence of erroneous operations in a simplified construction and assure accurate focussing and exposure and then eliminate the influence of erroneous operations.

In accordance with the present invention, a camera of the present invention comprises operable means changeable from an initial position to a predetermined position and vice versa, drive means for driving the operable means, detection means for detecting that the operable means reaches the predetermined position, and control means for controlling the drive means, whereby the operable means is forcibly reset in the initial position when an erroneous operation occurs.

Accordingly, the camera of the present invention can eliminate the influence of erroneous operations and assure accurate photography.

Also, the camera of the present invention can discriminate as to whether an erroneous operation occurs by a construction simpler than conventional devices.

These and other objects, features and advantages of the present invention will become clear from the following detailed description and drawings.

DESCRIPTION OF PREFERRED EMBODIMENTS

Figure 1:
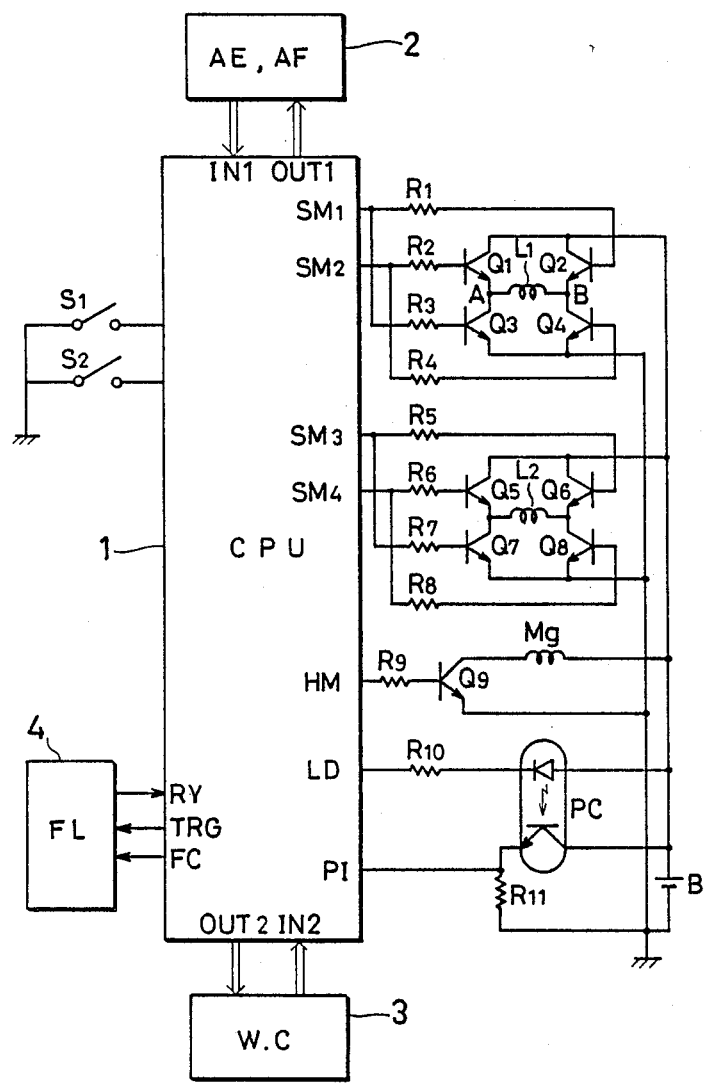
FIG. 1 is a block diagram showing the basic arrangement of the present invention.

Referring to FIG. 1 which is a block diagram showing the basic arrangement of the present invention, a central processing unit (referred to as CPU hereinafter) 1 is capable of performing the sequence control of operations of a camera, as well as various computations for determining the exposure conditions. An AE/AF unit 2 has a photometering section which measures the brightness of an object and delivers a digital value representing the measuring result to the CPU 1, and a range finding section which measures the distance from the object and delivers a digital value. A reference numeral 3 denotes a motor driving unit (represented by WC) which includes a motor for winding and rewinding a film, a driver for the motor, and a decoder. A reference numeral 4 denotes a flash unit (represented by FL) including the light-emitting section of an electronic flash, a booster circuit section for supplying an electrical power for charging up a capacitor of the electronic flash device, and a trigger section for controlling the flashing operation.

Symbols L1 and L2 represent coils of a stepping motor which is for the purpose of controlling the shutter operation and controlling the lens drive operation including extension of the lens to the in-focus position and charging or cocking of the lens which is executed to set the lens at the infinite-side end position after an exposure.

The stepping motor is of bipolar drive type employing two-phase excitation system which enables the motor to be reversed. Thus, the stepping motor can operate forwardly and backwardly. The coils L1, L2 are driven through transistors Q1 to Q8 to the bases of which are connected current-limiting resistors R1 to R8. A symbol Mg represents a magnet which conducts stopping of the lens as well as closing of the aperture, i.e., shutter closing. The magnet Mg is driven through a transistor Q9 to the base of which is connected a current-limiting resistor R9.

A symbol PC represents a photo-coupler composed of an LED and a photo-transistor which are arranged to oppose each other across later-mentioned shutter blades so that the light is interrupted according to the position of the shutter blades. A symbol R10 represents a current limiting resistor of the LED, while R11 is a current detection resistor for the photo-transistor. The electrical power for driving the coils L1, L2, the magnet Mg and the photo-coupler PC is supplied from a power supply B. A first-stage switch S1 and a second-stage switch S2 are operatively connected to a release button (not shown) such that the switch S1 is turned on when the release switch is pressed at the end of a first half stroke and then the switch S2 is turned on when the same is pressed at the end of the second half stroke.

The AE/AF unit 2 is operated in accordance with an instruction signal delivered through an output terminal OUT1. The results of photometry and range-finding operation performed by the AE/AF unit 2 are taken up through the input terminal IN1.

Output terminals SM1 and SM2 are output terminals for delivering signals which turn the transistors Q1 to Q4 on and off. The currents in the coils L1 is changed as shown in the following table in accordance with combinations of levels of signals available at the output terminals SM1 and SM2.

TABLE

| SM1 | SM2 | Current |
|-----|-----|---------|
| L | L | OFF |
| H | L | B to A |
| L | H | A to B |
| H | H | Inhibited |

Similarly, the signals for controlling the transistors Q5 to Q8, i.e., for controlling the currents in the coil L2, are derived through output terminals SM3 and SM4.

The operation of the magnet Mg is controlled by a signal derived through a control terminal HM. More specifically, when the signal level is high (H), the magnet Mg is energized. When the signal level is low (L), the magnet Mg is turned off. A symbol LD represents an output terminal for delivering a signal which controls the light-emission from the LED of the photo-coupler PC. The LED lights up when the level of this signal is low (L) but stops illumination when the signal is changed to high (H).

The film winding/rewinding motor in the motor driving unit 3 is controlled by a signal which is derived through a control output terminal OUT2. A signal obtained through monitoring of the state of film winding, e.g., a detection signal indicative of the completion of winding, is picked up through an input terminal IN2.

Signals for controlling the boosting of the electric energy of the flash unit and the triggering of the flash light emission are delivered through terminals FC and TRG respectively. A symbol RY represents a terminal for monitoring the charging state of a flash capacitor which is not shown.

Figure 2:
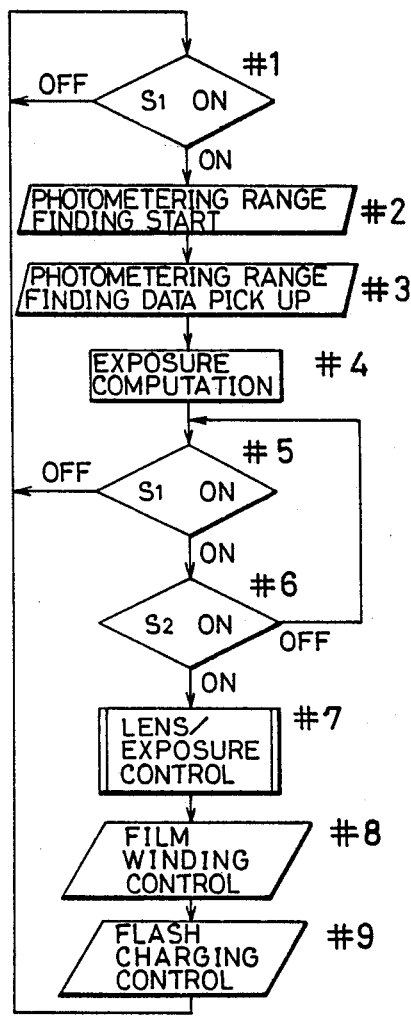
FIG. 2 is a flow chart showing a photographing sequence.

FIG. 2 is a flow chart illustrative of the photographing sequence.

When a release button (not shown) is pressed at the end of a first half stroke, the switch S1 is turned on. It is discriminated in step #1 whether the switch S1 is turned on. If the switch S1 is turned on, photometering and range finding operation are started step #2). After execution of step #2, the results of he photometry and range finding operations are picked up by the CPU 1. Upon receipt of these data, the CPU 1 performs computation of photographing conditions such as the shutter opening time (time value), timing of stopping of the lens and, as required, the timing of triggering of the flash light emission (steps #3, #4). It is discriminated again in step #5 whether the switch S1 is turned on. In step #6, it is discriminated whether the switch S2 is turned on. If the switch S1 and switch S2 are turned on, a lens is driven and exposure is executed in step #7. If necessary, the flash is illuminated. If the switch S1 is turned off, the sequence returns to the starting step. If the switch S2 is turned off, the sequence returns to step #5 in which it is discriminated whether the switch S1 is turned on. The lens and exposure control of step #7 will be described later with reference to FIGS. 3A and 3B.

Upon completion of the exposure, the film is wound and fed by a distance corresponding to one frame and the capacitor of the flash unit is charged up (step #8, step #9) thereby preparing for the next exposure (step #1).

A detailed description will be given hereinafter as to the driving of the shutter blades and the lens, with specific reference to FIGS. 7 to 11.

Figure 7:
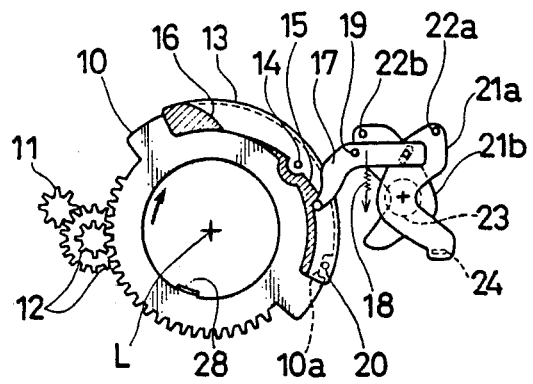
FIGS. 7, 9, and 10 are illustrations of a shutter blade driving sections.
Figure 8:
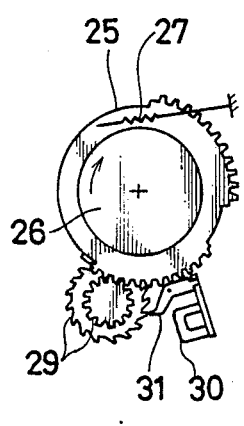
FIGS. 8 and 11 are illustrations of a lens driving cam unit.
Figure 9:
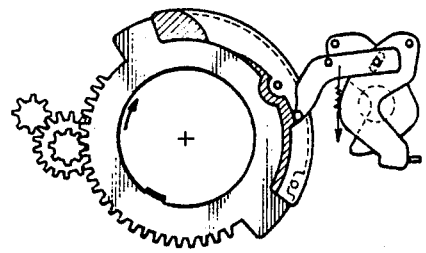
Figure 11:
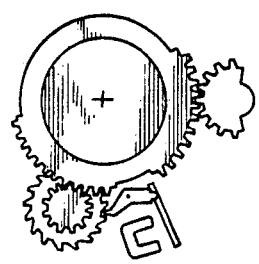
Figure 10:
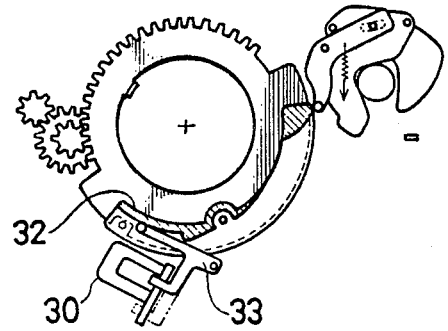

FIGS. 7, 9 and 10 illustrate a shutter blade driving unit. FIGS. 8 and 11 show a lens drive cam unit.

FIGS. 7 and 8 show these units in a set state before the driving. Referring to FIG. 7, a reference numeral 10 denotes a drive ring which is adapted to be driven forwardly and backwardly by a stepping motor (not shown) through a motor pinion 11 and reduction gears 12. A plurality of teeth for meshing with the one of the reduction gears 12 are formed on a half circumference of the drive ring 10, while a later-mentioned intermediate lever 13 is provided on the remainder half circumference of the drive ring 10. The drive ring 10 is rotatable through half revolution by the stepping motor. The intermediate lever 13 is rotatable about an intermediate lever shaft 14 which is provided substantially on the mid-portion thereof. Numerals 15 and 16 denote, respectively an initial position cam and a shutter opening cam which are formed on the intermediate lever 13. A blade driving lever 17 is urged by a spring 18 for clockwise rotation about the axis of a shaft 19. Thus, one end of the blade driving lever 17 is always held in contact with the portion of the intermediate lever which is on the leading side of the initial position cam 15.

The biasing force of the spring 18 urges the intermediate lever 13 in a clockwise direction at the first half of the rotation of the drive ring 10, and in a counterclockwise direction at the second half thereof.

An intermediate lever pin 20 is provided for the purpose of preventing clockwise rotation of the intermediate lever 13 by the force of the spring 18. Namely, the intermediate lever pin 20 engages with a notch 10a formed in the drive ring 10, thereby preventing rotation when the spring 18 urges the intermediate lever 13 in a clockwise direction. Numerals 21a and 21b denote, respectively, blades which are curved in opposite directions at their mid-portions. These blades 21a and 21b are secured to the other end of the blade driving lever 17 in such a manner as to overlap each other. The blades 21a and 21b are swingably carried by shafts 22a and 22b provided on upper parts of these blades 21a and 21b and are retained by the blade driving lever 17 by a common shaft on the blade driving lever 17 in such a manner that they can slightly move laterally. Therefore, when the blade driving lever 17 is rotated counterclockwise, both blades 21a, 21b are moved apart to the left and right (see FIG. 10) so as to open the aperture, whereas a clockwise rotation of the blade driving lever 17 causes both blades to move towards each other thereby closing the aperture, thus performing the shutter function. A broken-line circle denoted by a numeral 23 indicates the range of the shutter opening, i.e., aperture. A reference numeral 24 designates the position where the photocoupler PC is secured. A symbol L represents the optical axis of the taking lens. The shutter opening range circle 23 is illustrated to be smaller in diameter than the driving ring 10 in these figures. Actually, however, the shutter opening range circle 23 has a diameter which is substantially the same as the inside diameter of the driving ring 10. It is also to be understood that the shutter opening range circle 23 is concentric with the optical axis L, through the shutter opening range circle 23 is illustrated apart from the driving ring 10 for the purpose of clarification of the drawings. More specifically, the blade driving lever 17 is bent 180° at the portion thereof contactable with the cams 15 and 16 so that the shutter opening range circle 23 overlaps the circle of the lens. In other words, the center of the circle 23 is placed on the optical axis L of the lens.

Referring now to FIG. 8, a cam ring 25 is provided with gear teeth on a portion of the outer peripheral surface thereof. A lens 26 is held on cams (not shown) provided on equi-spaced three circumferential portions of the cam ring 25. More specifically, the lens 26 is pressed against the cams by springs (not shown). Thus, the lens 26 is shiftable in accordance with the rotation of the cam ring 25. The number of teeth on the lower portion of the cam ring 25 is smaller than the number of teeth of the drive ring 10. This is because the cam ring 25 is required only to drive the lens 26 to the in-focus position, i.e., to the most proximal end position at the greatest from the initial position of FIG. 8, whereas the drive ring 10, which is started to rotate simultaneously with the cam ring 25, is required to perform the driving of the shutter blade after the lens is driven.

A reference numeral 27 denotes a spring disposed at a suitable position between the cam ring 25 and a stationary part of the camera so as to urge the cam ring 25 always in the clockwise direction. The lens and other parts are actually disposed to overlap the blades 21a and 21b. As will be seen from FIG. 7, a drive ring projection 28 projects inwardly from a portion of the inner peripheral surface of the drive ring 10. The clockwise biasing force of the spring 27 is received by the projection 28, whereby the cam ring 25 is normally rotated together with the drive ring 10. A reference numeral 29 denotes a stopper gear carrying a gear which is provided with a ratchet formed integrally and coaxially with a gear meshing with the gear of the cam ring 25. A numeral 30 designates a magnet carrying a stopper claw 31. When the magnet 30 is turned on, the stopper claw 31 comes out of engagement with the ratchet as shown in FIG. 8 so as to release the stopper gear 29, whereas de-energization of the magnet 30 causes the rotation of the stopper claw 31 by a spring not shown in FIG. 8 to mesh with the ratchet thereby fixing the stopper gear 29 and, hence, fixing the cam ring 25 against rotation.

FIG. 7 shows an initial state of the above-described mechanism in which the blade driving lever 17 is still kept away from the initial position cam 15. In this state, therefore, the shutter blades 21a and 21b are not moved in the aperture opening direction so that the aperture is kept closed.

FIG. 9 shows another state of the above-described mechanism in which the blade driving lever 17 has been brought into contact with the initial position cam 15. Specifically, a slight clockwise rotation of the rotor of the stepping motor causes the initial position cam 15 to slightly rotate the blade rotation lever 17 so as to move the blades 21a and 21b apart from each other to the left and right. In this state, the aperture has not been opened yet but the LED and the photo-transistor of the photocoupler PC face each other to enable the state of operation of the shutter to confirm.

This arrangement also enables confirmation of the state of operation of the drive ring 10 when the same is reversed to the initial set position after being fully rotated to a position which will be described later.

In FIG. 10, the drive ring 10 is fully rotated clockwise to the maximum rotation position. In this state, the blade driving lever 17 has been brought into contact with the cam 16, and the shutter is fully opened. In this Figure, a retainer cam and a retainer lever are denoted by 32 and 33, respectively. When the magnet 30 is energized, the retainer lever 33 is held in contact with the retainer cam 32 so that the intermediate lever 13 is not rotated counterclockwise even by the clockwise biasing force exerted on the blade driving lever 17. When the magnet 30 is deenergized, the biasing force exerted on the retainer cam 32 by the retainer lever 33 is extinguished as will be explained later in connection with FIG. 12, so that the intermediate lever 13 is released to rotate counterclockwise. As a result, the blade driving lever 17 is rotated clockwise without delay so as to quickly drive the shutter blades 21a and 21b in the aperture closing direction, whereby the aperture is closed.

Figure 12:
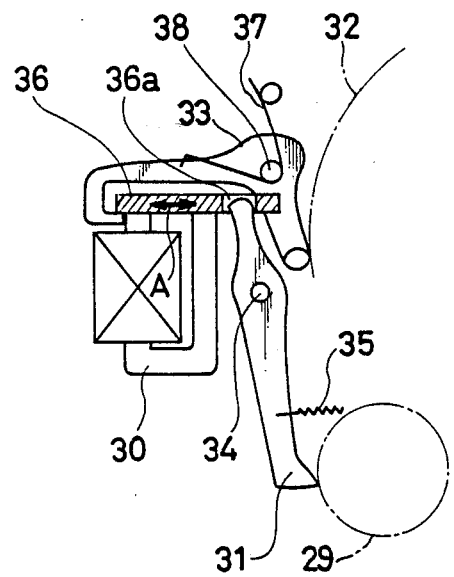
Fig. 12 is an illustration showing the detail of a magnet, a stopper claw and a retainer lever which are shown in FIGS. 8 and 11.

FIG. 12 shows a detailed rear view of a portion including the magnet 30, stopper claw 31 and the retainer lever 33 which are shown in FIGS. 8 and 10.

Referring to FIG. 12, a reference numeral 34 denotes a rotatable shaft carrying the stopper claw 31, while 35 denotes a spring for biasing the stopper claw 31 clockwise. Numeral 36 denotes a contactor which is slidably supported by the retainer lever 33 in the directions of a double-headed arrow A. An opening 36a formed in the contactor 36 receives one end of the stopper claw 31 so that the contactor 36 is slightly slidable in the directions of the arrow A in accordance with the rotation of the stopper claw 31.

The retainer lever 33 is biased for counterclockwise rotation about the axis of a rotary shaft 38 by a slight resilient force produced by the spring 37. The left end of the retainer lever 33 is bent in a U-like form and the left end portion of the contactor 36 is retained by the U-shaped portion of the retainer lever 33.

When the magnet 30 is energized in the initial set position as shown, the contactor 36 is held at the right-side end of its sliding stroke. (The stopper gear 29 has no teeth in this region, though the absence of the teeth is not illustrated in FIGS. 8 and 12.) As a result, the end of the stopper claw 31 is out of engagement with the stopper tooth of the stopper gear 29. Consequently, the lens driving operation is started to drive the lens 26 to the in-focus position. When the lens 26 reaches the in-focus position, the magnet 30 is deenergized to allow the contactor 36 to move. At this time, the drive ring 10 is in a region of its first half rotation, and the rotation of the retainer lever 33 is inhibited because the biasing force of the spring 18 is received by the pin 20 and the notch 10a, and the biasing force of the spring 37 urges the retainer lever 33 to attract it to the magnet 30. Thus the contactor 36 slidingly moves to the left stroke end by the force of the spring 35, thereby to stop and hold the stopper gear 29.

After the rotation of the drive ring 10, i.e., the rotation of the intermediate lever 13 is started, the retainer lever 33 is held at the same position by the attracting force of the magnet 30 and the force of the spring 37 before the magnet 30 is deenergized, and by the force of the spring 37, solely after the magnet 30 is deenergized until energized again. Meanwhile, the lens is fixed against rotation because the stopper claw 31 is still held in, engagement with the stopper gear 29, thus eliminating an risk of defocus.

When the magnet 30 is deenergized again, the blade spring 18 (see FIG. 7) drives the blades in the closing direction overcoming the resilient force of the spring 37 at this time, the drive ring 10 is in a region of its second half rotation. As described above, the spring 37 produces a resilient force which is smaller than that produced by the blade spring 18.

Figure 6:
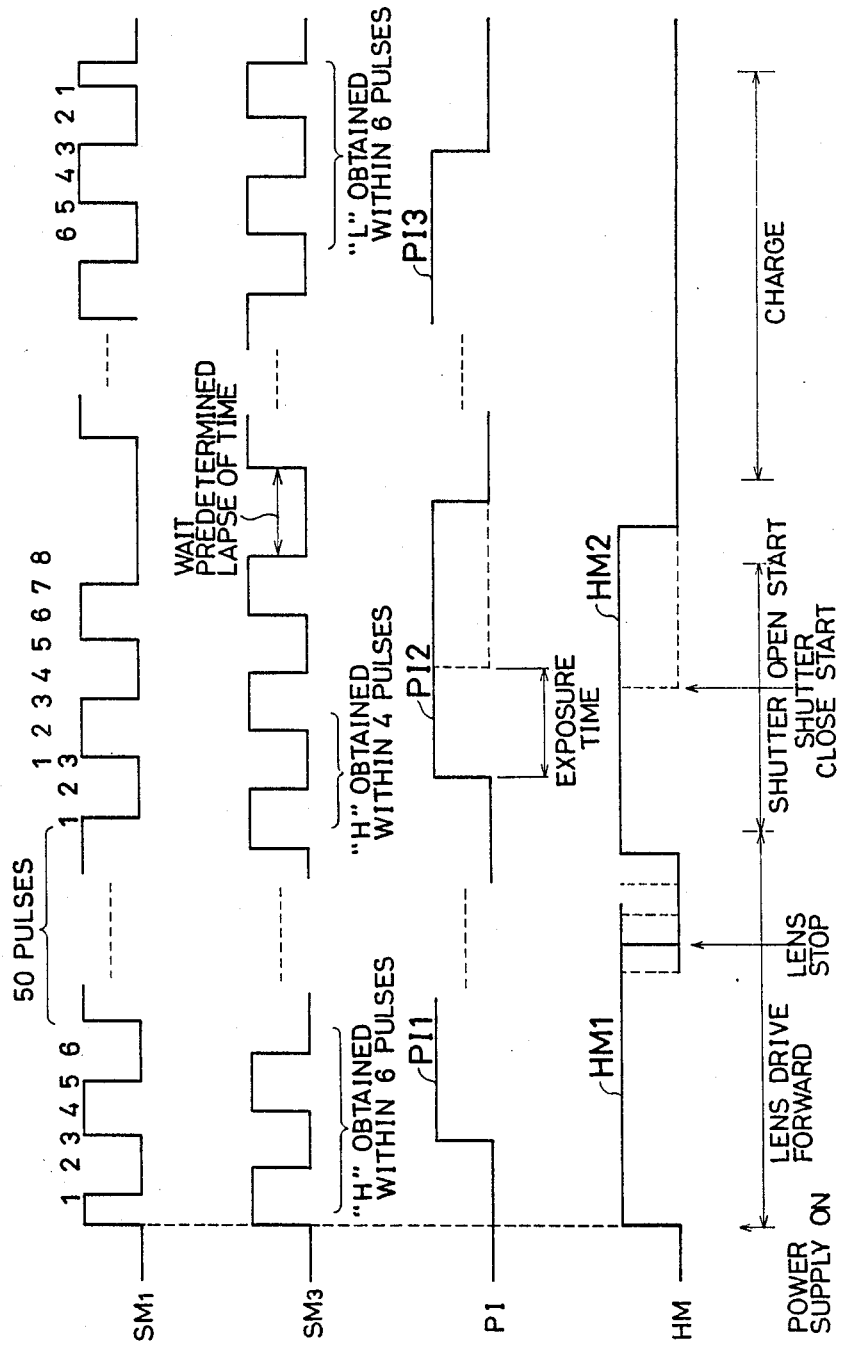
FIG. 6 is a time chart illustrating the operation of the present invention.

FIG. 6 is a time chart illustrating the operation of the device in accordance with the present invention. The operation of the device will be fully understood when reference is made to this time chart in the course of the following description of the sequence taken in conjunction with the flow chart shown in FIGS. 3A and 3B.

Figure 3A:
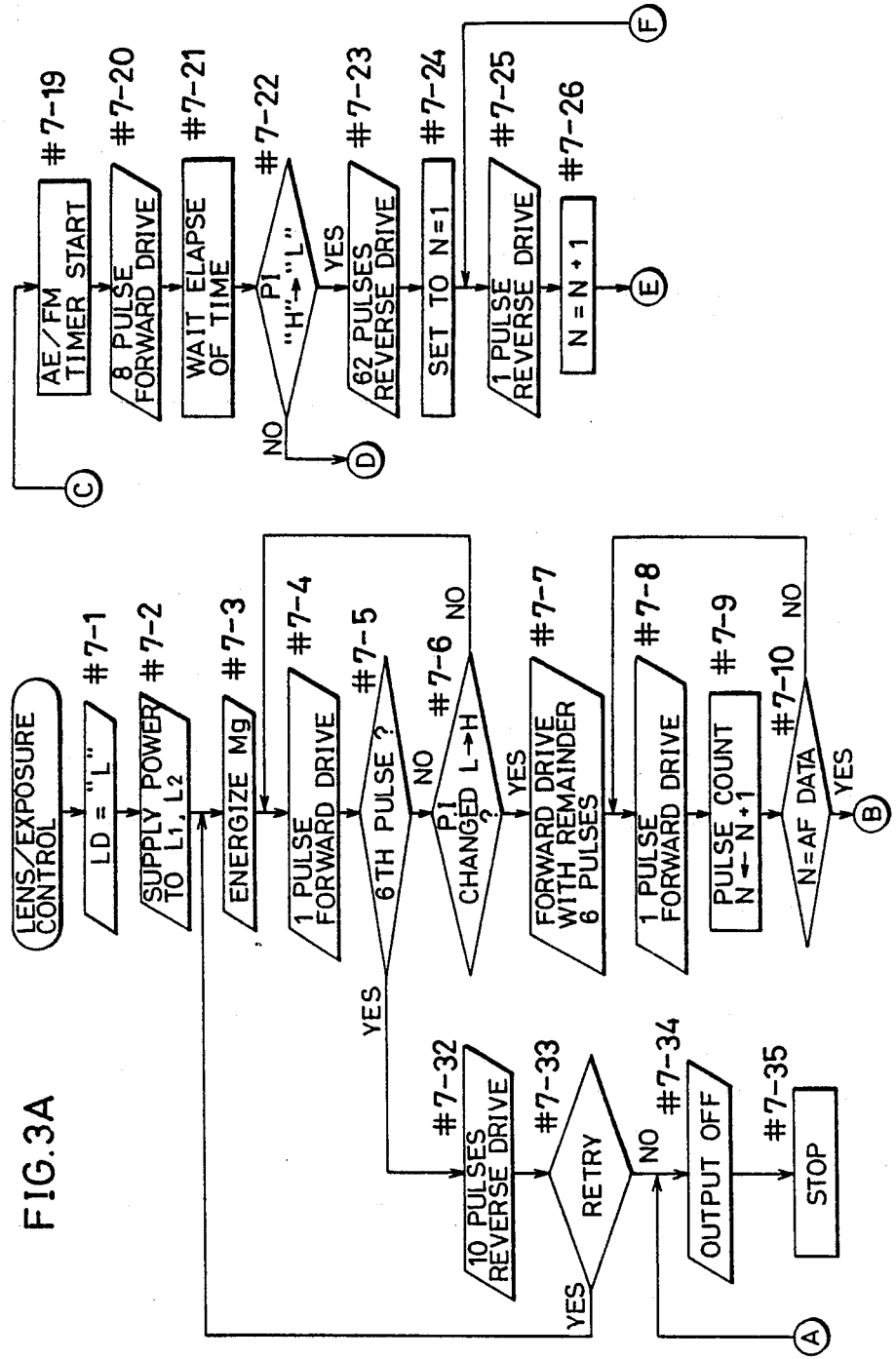
FIGS. 3A and 3B are a flow chart showing the detail of the lens and exposure control step #7 in the flow shown in FIG. 2.
Figure 3B:
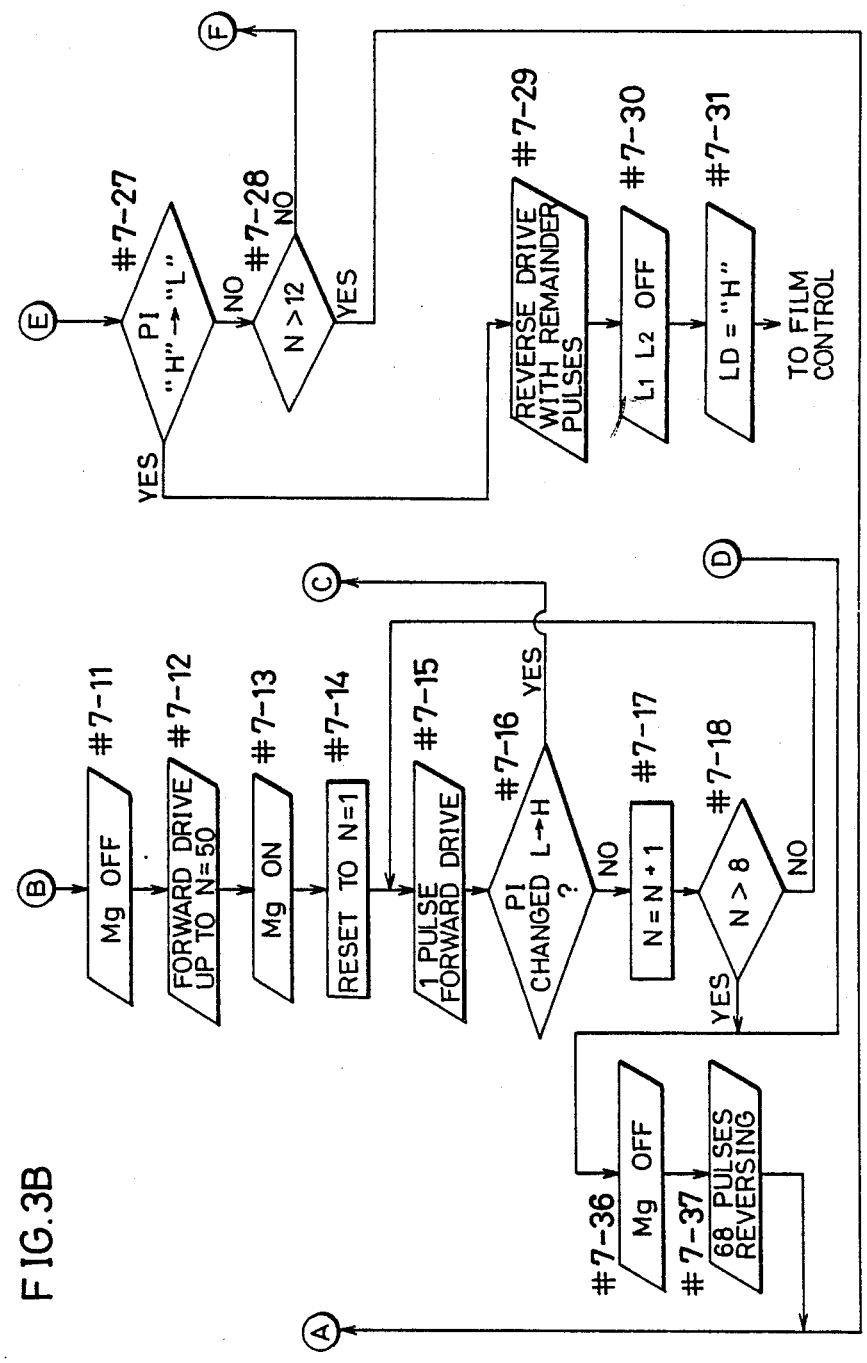

The flow chart of FIGS. 3A, 3B show details of the operations executed in the lens/exposure control of step #7 of the sequence of FIG. 2.

When the camera is set in the state ready for exposure (step #6), the CPU 1 operates to set the terminal LD to low level (L). Consequently, the LED of the photo-coupler is allowed to illuminate (step #7-1) so as to enable the photo-coupler to detect the operation of the drive ring 10. If the drive ring 10 is held in the initial set position, the light from the LED is interrupted by the blade 21a, so that the terminal PI is set at low level (L) because of absence of the output from the photo-transistor.

Subsequently, the terminals SM1 and SM3 are set to high level (H) so as to enable electrical power to be supplied to the coils L1 and L2 of the stepping motor (step #7-2). When the drive ring 10 is in the initial set position, the supply of electrical current to the coils L1 and L2 is executed in such a manner as to lock the rotor of the stepping motor against rotation.

In advance of the start of rotation of the drive ring 10, the terminal HM is set to high level (H) as shown by HM1 in FIG. 6 so as to energize the magnet Mg, i.e., the magnet 30 of FIG. 8 (step #7-3). Consequently, the cam ring 25 is caused to rotate together with the drive ring 10 and the state of FIG. 8 is then attained. In this state, the rotation of the cam ring 25 causes the taking lens 26 integral therewith to be projected to the in-focus position.

Then, pulse signals of a predetermined phase are supplied to the terminals SM1 and SM3 so as to initiate the rotation of the stepping motor. The rotation of the stepping motor in response to first five pulses (see SM1, SM3 of FIG. 6) causes the initial position cam 15 to come into contact with the blade driving lever 17, so that the blades 21a and 21b are slightly moved apart to enable the photo-transistor to produce an output. This state is confirmed by checking whether the signal at the terminal PI is at high level (H) (step #7-4 to step #7-6). If the level of the signal at the terminal PI is still held at low level (L) even after the supply of the five consecutive pulses, the CPU 1 judges that an abnormal state occurs due to malfunction of the stepping motor itself, any defect in the linking mechanism, deviation of the stepping motor from the initial set position, erroneous meshing or breakage of a gear teeth, or other causes. In such a case, i.e., when the answer is YES in step #7-5, 10 consecutive pulses are supplied in reverse phase so that the stepping motor is reset to the initial position. Then, the above-described operation is tried only once again (steps #7-32. #7-33). If the same abnormality is found after the retrial, the CPU 1 judges that a failure occurs. Subsequently, all the outputs are turn off and the CPU 1 is suspended (step #7-34, step #7-35). At the same time, a warning is generated to inform the photographer of the occurrence of the failure.

When the signal of the high level (H) is obtained at the terminal PI in response to the first five consecutive pulses or after the retrial, i.e , when the answer is YES in step #7-6, the rotor of the stepping motor is rotated to a position which corresponds to 6 pulses from the initial set position (step #7-7).

The stepping motor further operates forwardly. In the mean time, it is discriminated for each of the consecutive driving pulses whether the lens reaches a previously computed in-focus position (Step #7-8 to step #7-10. When the lens 26 reaches the in-focus position, i.e., when the answer is YES in step #7-10, the terminal HM is set to low level (L) (see trailing end portion of HM1 in FIG. 6) . Subsequently, the magnet Mg is deenergized so as to stop and fix the lens 26 (step #7-11) and the state of FIG. 11 is attained. In consequence, the lens 26 is driven to and fixed at the in-focus position.

Subsequently, the stepping motor is made to operate forwardly by 50 consecutive pulses (step #7-9 to step #7-12). In this state, the magnet Mg is energized once again as shown by HM2 in FIG. 6 (step #7-13). In the meantime i.e., in the period corresponding to the phase between the position immediately after the initial position cam 15 and the position immediately before the shutter opening cam 16, the signal at the terminal LD is set to low level (L) (see FIG. 6).

A further supply of the forward driving pulses brings the shutter opening cam 16 into contact with the blade driving lever 17 so as to enable the latter to bias the intermediate lever 13 counterclockwise. In this state, if the intermediate lever 13 is allowed to move, the blade driving lever 17 and the blades 21a, 21b are not allowed to move so that the aperture can not be opened. Therefore, the magnet 30 is beforehand energized (step #7-13) as explained before, and the retainer lever 33 is brought into contact with the retainer cam 32, thereby fixing the intermediate lever 13 against the rotational biasing force.

The forward driving pulses are fed in a one-by-one fashion with detecting a change of the level from (L) to (H) (see FIG. 6) at the terminal PI(step #7-15, step #7-16). When the operation state is normal, the change to high level (H) can be detected within 4 forward driving pulses. However, in view of the above-mentioned defects or troubles, the detection is executed until 8 consecutive pulses are supplied (step #7-18). When the change to high level (H) at the terminal PI is not detected even after the supply of 8 forward driving pulses, i.e., when the answer is YES in step #7-18, the magnet 30 is deenergized and 68 consecutive reverse phase pulses are supplied which is greater in number than the forward driving pulse. In consequence, the drive ring 10 and the cam ring 25 are reset to the initial position without fail and the exposure is consequently inhibited (steps #7-36, #7-37, step #7-34).

Figure 4:
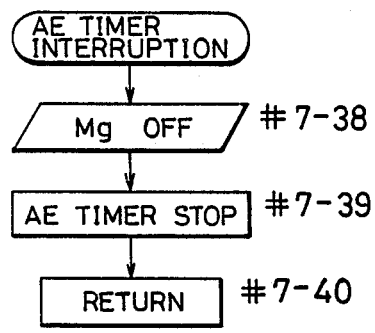
FIG. 4 is a chart showing an exposure control.

Conversely, when the change to high level (H) at the terminal PI is detected within the period of 8 forward driving pulses, i.e., when the answer is YES in step #7-16, shutter control/flash illumination control timer is started in step (step #7-19) and exposure control is executed after elapse of a predetermined time as shown in FIG. 4. At the same time, the stepping motor is rotated forwardly by an amount corresponding to 8 pulses (step #7-20), whereby the blades 21a and 21b are driven to open the aperture. Consequently the state of FIG. 10 is attained.

Figure 5:
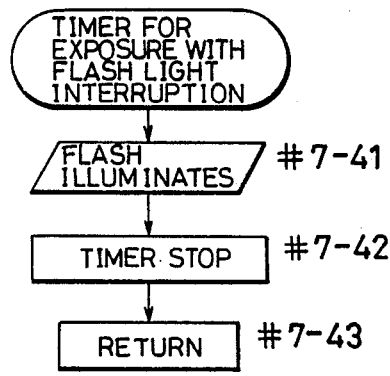
Fig. 5 is a flow chart showing an electronic flash control.

In the mean time, the above-mentioned interruptions are executed. Specifically, deenergization of the magnet 30 causes the blade driving lever 17 to drive the intermediate lever 13 to rotate counterclockwise by the force of the spring 18, so that the blades 21a and 21b are quickly moved to the closing position (see HM2 of FIG. 6). In addition, the light emission control for the electronic flash as shown in FIG. 5 is executed if necessary (step #7-41 to step #7-43).

After waiting a predetermined time necessary to ensure that the blades 21a and 21b are moved to the full closing position in step #7-21 (see SM3 of FIG. 6), it is discriminated in step #7-22 whether the level of the terminal PI is set at low level (L). When the movement of the blades 21a and 21b to the full closing position is not confirmed, i e., when the answer is NO, the CPU 1 judges that an abnormal state occurs and the sequence advances to step #7-36.

When the normal operation is confirmed, i.e., when the answer is YES in step #7-22, reverse 62 consecutive pulses are supplied for the purpose of charging or cocking of the lens in step #7-23. Further, 12 pulses are supplied. In the supply of the further 12 pulses, it is discriminated for each pulse in steps #7-24 to #7-28 whether the initial position cam 15 is returned to the position where it comes into contact with the blade driving lever 17, in other words, whether the signal at the terminal PI changes from high level (H) to low level (L) (see trailing end position of P13, FIG. 6). It should be noted that although the initial positon cam 15 usually returns within 6 pulses, 12 pulses are supplied in this embodiment to assure an increased reliability. When it is not detected that the signal at the terminal PI changes from high level (H) to low level (L) even after the supply of 12 pulses, i.e., when the answer is YES in step #7-28, the CPU 1 judges that an abnormal state occurs and the sequence advances to step #7-34.

Conversely, when the signal at the terminal PI changes to low level (L), i e., when the answer is YES in step 190 7-27, the remainder pulses are supplied to ensure that the drive ring 10 and the cam ring 25 are returned to the initial set position without fail (step #7-29). In consequence, the lens is charged or cocked to the infinite end position.

Furthermore, the supply of electrical current to the coils L1, L2, and the LED is stopped (steps #7-30, #7-31). Then, the photography is completed.

It will be seen from the foregoing description that a single detection device employing the photo-coupler PC can check various operation portions for failure, specifically, whether or not the drive ring 10 starts its operation without failure (step #7-5), whether or not the shutter is in normal condition immediately before opening the aperture (step #7-18), whether or not the shutter is firmly closed (step #7-18), and whether or not the reset of the drive ring and the cam ring to the initial position (lens charge) are assuredly executed.

Thus, the present invention enables reduction in the number of parts as compared with conventional cameras carrying a plurality of sensors for checking various operation states independently thus contributing to reduction in the production cost as well as minimizing the installation space.

In the present invention, lens driving operation and the shutter opening operation are executed in a consolidated manner until a lens reaches an in-focus position and, thereafter, shutter opening operation is executed alone. Thus, the lens driving operation and the shutter opening operation can be monitored only by providing sensing means such as a photo-coupler for operation in connection with the operation of the shutter.

Furthermore it would be understood that the foregoing description relates to an embodiment of the present invention and the scope of the present invention is defined by the appended claims rather than by the description preceding them, and all changes that fall within metes and bounds of the claims, or equivalence of such metes and bounds are therefore intended to be embraced by the claims.

What is claimed is:

1. A camera comprising:
    operable means changeable from an initial position to a predetermined position and vice versa;
    drive means for driving said operable means;
    detection means for detecting that said operable means reaches the predetermined position;
    a first control means for controlling said drive means so that said operable means changes from the initial position to the predetermined position; and
    a second control means for controlling said drive means so that said operable means returns to the initial position unless said operable means reaches the predetermined position within a predetermined driving amount of said drive means.

2. A camera according to claim 1 wherein said drive means includes a pulse motor.

3. A camera according to claim 1 further comprising a third control means for suspending a photography operation of the camera unless said operable means reaches the predetermined position within another predetermined driving amount of said drive means which is caused by said first control means after said operable means is returned to the initial position by said second control means.

4. A camera comprising:
    range finding means for measuring the distance to an object;
    photometering means for measuring the brightness of the object;
    operable means in which a focus adjustment operation is executable from an initial position to a predetermined position and an exposure adjustment operation is executable beyond the predetermined position;
    drive means for driving said operable means;
    detection means for discriminating whether said operable means reaches the predetermined position when said drive means generates a predetermined driving amount; and
    control means for controlling said drive means so that said operable means executes the focus adjustment operation and the exposure adjustment operation, and controlling said drive means so that said operable means returns to the initial position when said detection means discriminates that said operable means does not reach the predetermined position.

5. A camera according to claim 4 wherein said drive means includes a pulse motor.

6. A camera according to claim 4 wherein said control means further suspends a photography operation of the camera when said detection means discriminates that said operable means does nor reach the predetermined position.

7. A camera comprising:
range finding means for measuring the distance to an object;
photometering means for measuring the brightness of the object;
a first actuating means for actuating said range finding means and said photometering means;
operable means in which a focus adjustment operation is executable from an initial position to a predetermined position, and an exposure adjustment operation is executable beyond the predetermined position;
drive means for driving said operable means;
detection means for discriminating whether said operable means reaches the predetermined position when said drive means generates a predetermined driving amount;
control means for controlling said drive means so that said operable means executes the focus adjustment operation and the exposure adjustment operation;
a second actuating means for actuating said control means; and
prohibition means for prohibiting the exposure adjustment operation of said control means when said detection means discriminates that said operable means does not reach the predetermined position.

8. A camera according to claim 7 wherein said drive means includes a pulse motor.

9. A camera according to claim 7 wherein said control means further suspends a photography operation of the camera when said detection means discriminates that said operable means does not reach the predetermined position.

10. A camera comprising:
range finding means for measuring the distance to an object;
photometering means for measuring the brightness of the object;
a first actuating means for actuating said range finding means and said photometering means;
operable means in which a focus adjustment operation is executable in a first operation section extending from an initial position to a predetermined position, and an exposure adjustment operation is executable in a second operation section extending beyond the predetermined position:
drive means for driving said operable means;
a first detection means for discriminating whether said operable means reaches the predetermined position when said drive means generates a predetermined driving amount;
control means for controlling said drive means so that said operable means executes the focus adjustment operation and the exposure adjustment operation;
a second actuating means for actuating said control means;
a second detection means for discriminating whether an erroneous operation occurs in at least one of said operable means and said drive means when said operable means changes from the first operation section to the second operation section; and
prohibition means for prohibiting the exposure adjustment operation of said control means when said second detection means discriminates that an erroneous operation occurs 11. A camera according to claim 10 wherein said drive means includes a pulse motor.

12. A camera according to claim 10 wherein said control means further suspends a photography operation of the camera when said first detection means discriminates that said operable means does not reach the predetermined position.

13. A camera comprising:
range finding means for measuring the distance to an object;
photometering means for measuring the brightness of the object;
operable means for executing a focus adjustment operation and an exposure adjustment operation;
drive means for driving said operable means;
control means for controlling said drive means so that said operable means executes the focus adjustment operation and the exposure adjustment operation, and controlling said drive means so that said operable means returns to an initial position after the completion of exposure:
detection means for discriminating whether said operable means returns to the initial position; and
a second control means for suspending a photography operation of the camera when said detection means discriminates that said operable means does not return to the initial position.

14. A camera according to claim 13 further comprising winding means for winding a film when said operable means returns to the initial position.

* * * * *

UNITED STATES PATENT AND TRADEMARK OFFICE
CERTIFICATE OF CORRECTION

PATENT NO. : 4,918,479

DATED : April 17, 1990

INVENTOR(S) : Manabu Inoue, et al.

It is certified that error appears in the above-identified patent and that said Letters Patent is hereby corrected as shown below:

In col. 1, line 21, after "motor", insert --.-- (period).

In col. 2, line 13, change ":" (colon) to --;-- (semicolon).

In col. 2, line 19, before "chart", insert --flow--.

In col. 2, line 25, change "sections" to --section--.

In col. 3, last line, after "started", insert --(-- (parenthesis).

In col. 4, line 1, change "he" to --the--.

In col. 4, line 38, after "through", insert --a--.

In col. 7, line 15, change "an" to --any--.

In col. 9, line 54, delete "190".

In col. 10, line 7, after "independently", insert --,-- (comma).

UNITED STATES PATENT AND TRADEMARK OFFICE
CERTIFICATE OF CORRECTION

PATENT NO. : 4,918,479             Page 2 of 2

DATED : April 17, 1990

INVENTOR(S) : Manabu Inoue, et al.

It is certified that error appears in the above-identified patent and that said Letters Patent is hereby corrected as shown below:

In col. 10, line 18, after "Furthermore", insert --,-- (comma).

In col. 11, line 10 (claim 6, line 4), change "nor" to --not--.

In col. 12, line 44 (claim 13, line 14), change ":" (colon) to --;-- (semicolon).

Signed and Sealed this

Eighth Day of October, 1991

Attest:

HARRY F. MANBECK, JR.

Attesting Officer        Commissioner of Patents and Trademarks